3,795,698
ACETOXY METHYL AND PIVALOYLOXYMETHYL 5-ACETAMIDO - 2,4,6 - TRIIODO-N-METHYLISO-PHTHALAMATES
Maurice John Soulal, Long Ditton, and Kenneth Utting, Lower Kingswood, England, assignors to Beecham Group Limited, Brentford, England
No Drawing. Filed Sept. 8, 1971, Ser. No. 178,843
Claims priority, application Great Britain, Sept. 9, 1970, 43,070/70
Int. Cl. C07c 79/46
U.S. Cl. 260—471 R      2 Claims

ABSTRACT OF THE DISCLOSURE

Iodine-containing organic acids of the formula

XYCH·COOR wherein R is an electron-attracting group and either X is hydrogen and Y is a group of the formula:

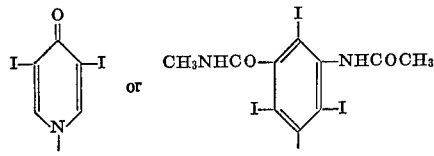

or X is $CH_3 \cdot (CH_3)_n$ wherein n is 0 to 6 and Y is a group of the formula:

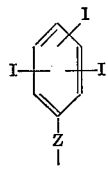

wherein Z is oxygen, sulphur or $(CH_2)_m$ wherein m is 0 to 6 and when Z is $CH_2$ there may be a $NH_2$ group in the 3-position, are useful as X-ray contrast agents. Acetoxymethyl 5-acetamido-2,4,6-triiodo-N-methylisophthalamate, pivaloyloxymethyl 5-acetamido-2,4,6-triiodo-N-methylisophthalamate, acetoxymethyl 3-amino-α-ethyl-2,4,6-triiodohydrocinnamate, and pivaloyloxymethyl 3-amino-α-ethyl-2,4,6-triiodohydrocinnamate are also useful as X-ray contrast agents.

---

This invention relates to derivatives of iodine-containing organic acids, which are of particular use as X-ray contrast agents.

In general, X-ray contrast agents used heretofore have been either highly water-soluble compounds that are rapidly excreted from the body or iodized oils, which tend to lose iodine in the body with consequential toxic side rejections.

It is an object of the present invention to provide derivatives of iodine-containing organic acids that overcome the above-mentioned disadvantages.

Accordingly the present invention provides derivatives of iodine-containing organic acids of the formula:

XYCH·COOR    (1)

wherein R is a group with electron-attracting properties, and either (a) X is a hydrogen atom and Y is one of the groups of the formula:

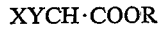

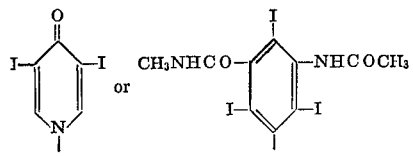

or (b) X is $CH_3 \cdot (CH_2)_n$—in which n is 0 or an integer from 1–6, and Y is a group of the formula:

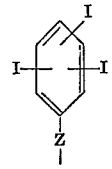

in which Z is an oxygen or sulphur atom or $(CH_2)_m$ in which m is 0 or or an integer from 1–6 and in which there may be a $NH_2$ group in the 3-position when Z is $CH_2$.

Typically the electron-attracting group R is a 2,2,2-trihaloalkyl, alkyl, acetoxymethyl or pivaloyloxymethyl group.

A particularly preferred compound of Formula I is the 2,2,2-trichloroethyl ester of α-(2,4,6-triiodophenoxy)butyric acid.

The compounds of Formula I are prepared by various methods depending on the nature of the substituent groups present. The ester may be prepared by esterification of the corresponding acids with the alcohols or by using reactive derivatives.

The invention also includes a pharmaceutical composition comprising a derivative of Formula I, together with a pharmaceutically acceptable carrier.

Primarily such compositions will usually be used for diagnostic purposes as X-ray contrast agents, especially in bronchography, the delineation of tissue planes, salpinography and transumbilical hepatography. The carriers used are those appropriate for the particular use, and since the derivatives of Formula I are water-insoluble, they may conveniently be administered as an aqueous dispersion, an aerosol, in micro-encapsulated form or in an oily solution.

When the derivatives of Formula I are synthesized to contain radioactive iodine, they may be used for therapeutic purposes.

The following examples illustrates the invention.

EXAMPLE 1

α-(2,4,6-triiodophenoxy)butyric acid (193.5 g., 0.35 mole) was dissolved in dry acetone (700 ml.) and the resulting solution was cooled to —5° C. 2,6-lutidine (37.5 g., 40.9 ml., 0.35 mole) was added, with stirring at —5° C., followed by ethyl chloroformate (37.8 g., 35.0 ml., 0.35 mole) diluted with dry acetone (140 ml.), also cooled to —5° C. Pyridine (10 drops) was added and the mixture was stirred for 2 minutes during which time a white precipitate formed. 2,2,2-trichloroethanol (56 g., 39.2 ml., 0.382 mole) in dry acetone (140 ml.) was added quickly, the cooling bath removed and the mixture allowed to attain room temperature with stirring; it was then stirred for a further hour during which time it became bright pink. The precipitate was filtered off and the filtrate concentrated at low pressure to a viscous oil, which was then diluted with ether, filtered and again concentrated. This residue was purified by molecular distillation at about 5 microns pressure to yield 2,2,2-trichloroethyl α-(2,4,6-triiodophenoxy) butyrate as a pale viscous oil in about 60% yield.

EXAMPLE 2

2,4,6-triiodophenol (283 g., 0.6 mole), n-butyl α-bromobutyrate (111.5 g., 0.5 mole) and anhydrous potassium carbonate (83 g., 0.6 mole) were refluxed with stirring for 24 hr. in 900 ml. acetone. The mixture was filtered and the filtrate stripped in vacuo to give a pale brownish oil. The oil was dissolved in ether which was then washed with sodium hydroxide solution (IN) and then water.

After drying the solution over magnesium sulphate, the ethereal solution was stripped in vacuo to give the butyl ester as a pale buff oil, which was analytically pure, in 85% yield.

$C_{14}H_{17}I_3O_3$.—Req. (percent): C, 27.35; H, 2.77; I, 62.05. Fd. (percent): C, 27.34; H, 2.77; I, 62.21.

Unreacted triiodophenol was recovered by acidifying the sodium hydroxide extracts, and based on the amount of triiodophenol consumed in the reaction, the yield of ester became 95%.

Benzyl α-(2,4,6-triiodophenoxy)butyrate was obtained by a similar procedure in 62% yield, M.P. 55–6° C., after recrystallization from 60–80° C. light petroleum.

$C_{17}H_{15}I_3O_3$.—Req. (percent): C, 31.48; H, 2.26; I, 58.79. Fd. (percent): C, 31.46; H, 2.29; I, 59.15.

EXAMPLE 3

55.8 g. α-(2,4,6-triiodophenoxy) butyric acid (0.1 mole) was dissolved in one equivalent of dilute sodium hydroxide solution. After filtering off a very small amount of insolubles, the solution was stripped in vacuo and dried in vacuo overnight over phosphorus pentoxide. The dry sodium salt was dissolved in 900 ml. dimethylformamide and 10.85 g. chloromethylacetate (0.1 mol) was added. The mixture was stirred for 24 hours at room temperature, filtered free of a small amount insolubles and stripped in vacuo. The residue was dissolved in ether, filtered free of insolubles and the solution was extracted with 10% sodium carbonate solution, and then washed with water. The ethereal solution was dried over magnesium sulphate and stripped. The residual oil crystallized overnight and was then recrystallized from 60–80° C. light petroleum to give acetoxymethyl α-(2,4,6-triiodophenoxy)butyrate, in 52% yield, M.P. 44–5° C.

$C_{13}H_{13}I_3O_4$.—Req. (percent): C, 25.41; H, 2.12; I, 62.05. Fd. (percent): C, 24.83; H, 2.05; I, 62.83.

EXAMPLE 4

Pivaloyloxymethyl α - (2,4,6 - triiodophenoxy)butyrate was obtained by a similar procedure to that of Example 3 in 60–65% yield as a pale yellow oil, which was 99% pure by gas-liquid chromatography (dimethylformamide was the impurity).

$C_{16}H_{19}I_3O_5$.—Req. (percent): C, 28.57; H, 2.83; I, 56.70. Fd. (percent): C, 27.71; H, 2.75; I, 57.01.

This material was purified by molecular distillation below 10 microns, to yield an almost colorless oil. Fractions were collected as indicated, each showing the same single zone by gas liquid chromatography.

Fraction 1.—B.P. 145–7° C. Fd. (percent): C, 28.69; H, 2.94; I, 56.69.
Fraction 2.—B.P. 147–9° C. Fd. (percent): C, 28.66; H, 2.85; I, 56.72.
Fraction 3.—B.P. 149–180° C. Fd. (percent): C, 28.46; H, 2.80; I, 56.61.

EXAMPLE 5

3,5-diiodopyrid - 4 - one-1-acetic acid and n-butanol (molar ratio 1:2) were azeotropically refluxed in benzene, with a catalytic amount of concentrated sulphuric acid, for about 5 hours. The ester crystallized out on cooling and was filtered off. The residue was exhaustively washed with saturated sodium bicarbonate solution and then water and finally recrystallized from ethanol. The butyl ester was a highly crystalline material, M.P. 184–5° C. Further product was obtained by washing the benzene solution with sodium bicarbonate solution and then water, and stripping the organic solution in vacuo.

$C_{11}H_{13}NI_2O_3$.—Req. (percent): C, 28.64; H, 2.82; N, 3.04; I, 55.09. Fd. (percent): C, 28.21; H, 2.72; N, 3.01; I, 56.13.

Similarly prepared were:
(i) The pentyl ester, M.P. 168–9° C. from ethanol:

$C_{12}H_{15}NI_2O_3$.—Req. (percent): C, 30.32; H, 3.16; N, 2.95; I, 53.47. Fd. (percent): C, 29.39; H, 2.96; N, 2.90; I, 54.39.

(ii) The nonyl ester, M.P. 151–3° C. from ethanol:
$C_{16}H_{23}NI_2O_3$.—Req. (percent): C, 36.16; H, 4.33; N, 2.64; I, 47.83. Fd. (percent): C, 35.46; H, 4.32; N, 2.61; I, 47.95.

(iii) The decyl ester, M.P. 167–8° C. from ethanol:
$C_{17}H_{25}NI_2O_3$.—Req. (percent): C, 37.43; H, 4.59; N, 2.57; I, 46.60. Fd. (percent): C, 36.83; H, 4.65; N, 2.54; I, 46.29.

All the above esters were obtained in 70–90% yield.

EXAMPLE 6

3,5-diiodopyrid-4-one-1-acetic acid and benzyl alcohol (molar ratio 1:2) were azeotropically refluxed in toluene, containing a catalytic quantity of toluene-p-sulphonic acid for about 5 hours. The isolation procedure was as described for the aliphatic esters in the previous examples. The benzyl ester had M.P. 248–50° C. after recrystallization from dimethylformamide/water.

$C_{14}H_{11}NI_2O_3$.—Req. (percent): C, 33.94; H, 2.22; N, 2.83; I, 51.31. Fd. (percent): C, 33.85; H, 2.25; N, 2.86; I, 52.05.

EXAMPLE 7

31.8 g. sodium 5-acetamido-2,4,6-triiodo-N-methylisophthalamate (0.05 mole) was dissolved in 500 ml. formdimethylamide and 5.4 g. chloromethylacetate (0.05 mole) was added, the mixture being then stirred for 24 hours at room temperature.

After filtering off the insolubles, the filtrate was stripped in vacuo, yielding a pale yellow oil which very slowly solidified. The solid was recrystallized from ethanol-water to give acetoxymethyl 5-acetamido-2,4,6-triiodo-N-methylisophthalamate in 90% yield, M.P. 237–7° C. (d.).

$C_{14}H_{13}I_3N_2O_6$.—Req. (percent): C, 24.49; H, 1.90; N, 4.08; I, 55.54. Fd. (percent): C, 24.64; H, 1.95; N, 3.99; I, 55.41.

EXAMPLE 8

Similarly by the procedure described in Example 8, pivaloyloxymethyl 5 - acetamido-2,4,6-triiodo-N-methylisophthalamide was obtained in 85% yield, M.P. 257–8° C. (d.), after recrystallization from ethanol-water.

$C_{17}H_{19}I_3N_2O_6$.—Req. (percent): C, 28.02; H, 2.61; N, 3.85; I, 52.34. Fd. (percent): C, 27.90; H, 2.64; N, 4.00; I, 52.35.

EXAMPLE 9

Sodium 3 - amino-α-ethyl-2,4,6-triiodohydrocinnamate (59.3 g., 0.1 mole) was dissolved in formdimethylamide (400 ml.) at 50° C. To this was added chloromethyl acetate (10.85 g., 0.1 mole) and the mixture was stirred for 2 hours. The reaction mixture was then poured into about 2 liters of ice-water, whereupon a white solid separated out. After two recrystallizations from ethanol-water, acetoxymethyl 3-amino-α-ethyl-2,4,6-triiodohydrocinnamate was obtained in 65% yield, M.P. 59–61° C.

$C_{14}H_{16}NI_3O_4$.—Req. (percent): C, 26.13; H, 2.49; N, 2.18; I, 59.25. Fd. (percent): C, 26.36; H, 2.48; N, 2.15; I, 59.29.

EXAMPLE 10

By a similar procedure, to that described in Example 8 pivaloyloxymethyl 3-amino-α-ethyl-2,4,6-triiodohydrocinnamate was obtained in 45% yield, M.P. 76–8° C.

$C_{17}H_{22}NI_3O_4$.—Req. (percent): C, 29.78; H, 3.21; N, 2.04; I, 55.62. Fd. (percent): C, 29.78; H, 3.26; N, 2.07; I, 55.03.

What is claimed is:
1. Acetoxymethyl 5-acetamido-2,4,6-triiodo-N-methylisophthalamate.

2. Pivaloyloxymethyl 5-acetamido - 2,4,6 - triiodo-N-methylisophthalamate.

References Cited

UNITED STATES PATENTS

| 2,064,944 | 12/1936 | Reitmann et al. | 260—296 R |
| 3,145,197 | 8/1964 | Hoey | 260—471 R |
| 3,435,066 | 3/1969 | Suter et al. | 260—372 G |

FOREIGN PATENTS

| 517,382 | 1/1940 | Great Britain | 260—295 R |

HENRY R. JILES, Primary Examiner

M. A. M. CROWDER, Assistant Examiner

U.S. Cl. X.R.

260—294.8 G, 295 R, 473 G, 482 R; 424—5